United States Patent
Hong

(10) Patent No.: US 11,683,085 B2
(45) Date of Patent: Jun. 20, 2023

(54) COMMUNICATION CONTROL METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 232 days.

(21) Appl. No.: 17/418,225

(22) PCT Filed: Dec. 28, 2018

(86) PCT No.: PCT/CN2018/125017
§ 371 (c)(1),
(2) Date: Jun. 24, 2021

(87) PCT Pub. No.: WO2020/133259
PCT Pub. Date: Jul. 2, 2020

(65) Prior Publication Data
US 2022/0085871 A1    Mar. 17, 2022

(51) Int. Cl.
*H04B 7/185* (2006.01)
*H04W 76/34* (2018.01)
(Continued)

(52) U.S. Cl.
CPC .......... *H04B 7/18506* (2013.01); *H04W 4/40* (2018.02); *H04W 48/02* (2013.01); *H04W 76/34* (2018.02)

(58) Field of Classification Search
CPC .... H04B 7/18506; H04W 4/40; H04W 48/02; H04W 76/34; B64U 2201/20;
(Continued)

(56) References Cited

U.S. PATENT DOCUMENTS

| 2017/0154536 A1 | 6/2017 | Kreiner et al. |
| 2018/0359021 A1 | 12/2018 | Westrup et al. |
| 2021/0243602 A1 | 8/2021 | Hong |

FOREIGN PATENT DOCUMENTS

| CN | 105825716 A | 8/2016 |
| CN | 105955295 A | 9/2016 |

(Continued)

OTHER PUBLICATIONS

International Search Report in the international application No. PCT/CN2018/125017, dated Oct. 9, 2019.
(Continued)

*Primary Examiner* — Dinh Nguyen
(74) *Attorney, Agent, or Firm* — Syncoda LLC; Feng Ma

(57) ABSTRACT

A communication control method includes: a core network device receives a first communication blocking request message from an unmanned aerial vehicle (UAV) service management system, where the first communication blocking request message includes at least one of a first identifier of a target UAV or a second identifier of a target controller for controlling the UAV, and instructs the core network device to disconnect a communication connection between the target UAV and the target controller; the core network device disconnects, according to the first communication blocking request message, the communication connection between the target UAV and the target controller; and the core network device sends a first communication blocking response message to the UAV service management system, where the first communication blocking response message indicates that the communication connection between the target UAV and the target controller has been disconnected.

18 Claims, 13 Drawing Sheets

(51) Int. Cl.
*H04W 4/40* (2018.01)
*H04W 48/02* (2009.01)

(58) Field of Classification Search
CPC .. G08G 5/0013; G08G 5/0026; G08G 5/0052; G08G 5/0069
See application file for complete search history.

(56) References Cited

FOREIGN PATENT DOCUMENTS

| | | | |
|---|---|---|---|
| CN | 107483098 | A | 12/2017 |
| CN | 108401503 | A | 8/2018 |
| CN | 108810941 | A | 11/2018 |
| EP | 3507999 | A1 | 7/2019 |
| WO | 2018071453 | A1 | 4/2018 |

OTHER PUBLICATIONS

English translation of the Written Opinion of the International Search Authority in the international application No. PCT/CN2018/125017, dated Oct. 9, 2019.
"3GPP TS 22.261 VI6.5.0", "3rd Generation Partnership Project; Technical Specification Group Services and System Aspects; Service Requirementsj(JY the 5G System; Stage 1(Release16) ", Sep. 30, 2018 (Sep. 30, 2018). entire document.
First Office Action of the Chinese application No. 201880003104.4, dated Apr. 29, 2022.
3GPP TSG-SA WG1 Meeting #84 S1-183433, (revision of S1-183236), Spokane, WA, USA, Nov. 12-16, 2018, Title: ID_UAS: Centralised UAV traffic management requirements, Agenda Item: 7.12, Source: Qualcomm Incorporated, Contact: Eddy Hall, edhall@qti.qualcomm.com.
3GPP TSG-SA WG1 Meeting #84 S1-183672, (revision of S1-183432, S1-183135), Spokane, WA, USA Nov. 12-16, 2018, Title: Proposal for normative ID_UAS General Requirements, Source: Huawei, Contact: Amanda. xiang@huawei.com.
Supplementary European Search Report in the European application No. 18945124.8, dated Jul. 6, 2022.

COMMUNICATION CONTROL METHOD AND APPARATUS

CROSS-REFERENCE TO RELATED APPLICATION

The present application is a national stage of International Application No. PCT/CN2018/125017 filed on Dec. 28, 2018, the disclosure of which is hereby incorporated by reference in its entirety.

TECHNICAL FIELD

The present disclosure relates to the technical field of communications, and in particularly to a method and an apparatus for controlling communication.

BACKGROUND

An Unmanned Aerial Vehicle (UAV), also referred to as a drone, is an unmanned aircraft operated by a radio remote control device and a program control apparatus provided by the UAV. At present, the UAV is mainly controlled by an UAV controller. From a technical point of view, UAVs can be classified as: an unmanned fixed-wing aircraft, an unmanned vertical lift aircraft, an unmanned airship, an unmanned helicopter, an unmanned multi-rotor aircraft, an unmanned parachute aircraft, or the like. With the rapid development of UAV technology, reduction of costs, and improvement of functions, the UAV is gradually being applied to the lives and work of ordinary consumers. However, the real application requirement of the UAV is UAV plus an industry application. Applications in fields and scenarios such as aerial photography, agriculture, plant protection, miniature self-photography, express transport, disaster relief, observation of wildlife, surveillance of infectious diseases, surveying and mapping, news reporting, power inspection, disaster relief, film and television shooting, romance-making and the like have greatly expanded the technology and use of the UAV.

In order to enable the cellular network to provide services that meet the requirements of the UAV, both the UAV and the UAV controller need to access the cellular network, and then the UAV controller can control and operate the UAV through the cellular network.

SUMMARY

The embodiments of the disclosure provide a method and an apparatus for controlling communication. The technical solutions are as follow.

In a first aspect of the embodiments of the present disclosure, a method for controlling communication is provided. The method for controlling communication is applied to a core network device and includes that:

a first communication blocking request message is received from an unmanned aerial vehicle (UAV) service management system, where the first communication blocking request message includes at least one of a first identifier of a target UAV or a second identifier of a target controller for controlling the target UAV, and the first communication blocking request message instructs the core network device to disconnect a communication connection between the target UAV and the target controller;

the communication connection between the target UAV and the target controller is disconnected according to the first communication blocking request message; and a first communication blocking response message is sent to the UAV service management system, where the first communication blocking response message indicates that the communication connection between the target UAV and the target controller has been disconnected.

The technical solution provided in the embodiments of the present disclosure may provide the following beneficial effects: the UAV service management system sends a first communication blocking request message carrying at least one of a first identifier of a target UAV or a second identifier of a target controller to a core network device of a cellular network, and the core network device disconnects the communication connection between the target UAV and the target controller, so that the UAV service management system can prevent, through the cellular network, the target UAV from communicating with the target controller, thereby improving management efficiency of the UAV system.

In an embodiment, the operation of disconnecting, according to the first communication blocking request message, the communication connection between the target UAV and the target controller includes that:

a first blocking object is determined from the target UAV and the target controller according to the first communication blocking request message, where the first blocking object includes at least one of the target UAV or the target controller; and detach request signaling is sent to the first blocking object, where the detach request signaling instructs the first blocking object to disconnect a network connection.

In an embodiment, the detach request signaling includes an identifier of a first peer device in communication with the first blocking object, and the detach request signaling instructs the first blocking object to disconnect a communication connection with the first peer device.

In an embodiment, the operation of disconnecting, according to the first communication blocking request message, the communication connection between the target UAV and the target controller includes that:

a second blocking object is determined from the target UAV and the target controller according to the first communication blocking request message, where the second blocking object includes at least one of the target UAV or the target controller; and a second communication blocking request message is sent to a target network access device to which the second block object belongs. The second communication blocking request message includes at least one of the first identifier of the target UAV or the second identifier of the target controller, and the second communication blocking request message instructs the target network access device to disconnect the communication connection between the target UAV and the target controller through Radio Resource Control (RRC) signaling.

In an embodiment, the second communication blocking request message includes user equipment (UE) context modification request signaling.

In a second aspect of the embodiments of the present disclosure, a method for controlling communication is provided. The method is applied to an unmanned aerial vehicle (UAV) service management system and includes that:

a first communication blocking request message is sent to a core network device, where the first communication blocking request message includes at least one of a first identifier of a target UAV or a second identifier of a target controller for controlling the target UAV, and the first communication blocking request message instructs the core network device to disconnect a communication connection between the target UAV and the target controller; and a first communication blocking response message is received from the core network device, where the first communication blocking response message indicates that the communication connection between the target UAV and the target controller has been disconnected.

In a third aspect of the embodiments of the present disclosure, an apparatus for controlling communication is provided. The apparatus includes a first receiving module, a communication connection disconnecting module, and a first sending module.

The first receiving module is configured to receive a first communication blocking request message from an unmanned aerial vehicle (UAV) service management system, where the first communication blocking request message includes at least one of a first identifier of a target UAV or a second identifier of a target controller for controlling the target UAV, and the first communication blocking request message instructs the core network device to disconnect a communication connection between the target UAV and the target controller.

The communication connection disconnecting module is configured to disconnect, according to the first communication blocking request message, the communication connection between the target UAV and the target controller.

The first sending module is configured to send a first communication blocking response message to the UAV service management system, where the first communication blocking response message indicates that the communication connection between the target UAV and the target controller has been disconnected.

In an embodiment, the communication connection disconnecting module includes a first determination sub-module and a first sending sub-module.

The first determination sub-module is configured to determine, according to the first communication blocking request message, a first blocking object from the target UAV and the target controller, where the first blocking object includes at least one of the target UAV or the target controller.

The first sending sub-module is configured to send detach request signaling to the first blocking object, where the detach request signaling instructs the first blocking object to disconnect a network connection.

In an embodiment, the detach request signaling includes an identifier of a first peer device in communication with the first blocking object, and the detach request signaling instructs the first blocking object to disconnect a communication connection with the first peer device.

In an embodiment, the communication connection disconnecting module includes a second determination sub-module and a second sending sub-module.

The second determination sub-module is configured to determine, according to the first communication blocking request message, a second blocking object from the target UAV and the target controller, where the second blocking object includes at least one of the target UAV or the target controller.

The second sending sub-module is configured to send a second communication blocking request message to a target network access device to which the second blocking object belongs, where the second communication blocking request message includes at least one of the first identifier of the target UAV or the second identifier of the target controller, and the second communication blocking request message instructs the target network access device to disconnect the communication connection between the target UAV and the target controller through RRC signaling.

In an embodiment, the second communication blocking request message includes UE context modification request signaling.

In a fourth aspect of the embodiments of the present disclosure, an apparatus for controlling communication is provided. The apparatus includes a second sending module and a second receiving module.

The second sending module is configured to send a first communication blocking request message to a core network device, where the first communication blocking request message includes at least one of a first identifier of a target unmanned aerial vehicle (UAV) or a second identifier of a target controller for controlling the target UAV, and the first communication blocking request message instructs the core network device to disconnect a communication connection between the target UAV and the target controller.

The second receiving module is configured to receive a first communication blocking response message from the core network device, where the first communication blocking response message indicates that the communication connection between the target UAV and the target controller has been disconnected.

In a fifth aspect of the embodiments of the present disclosure, an apparatus for controlling communication is provided. The apparatus includes a processor and a memory configured to store instructions executable by the processor.

The processor is configured to:

receive a first communication blocking request message from an unmanned aerial vehicle (UAV) service management system, where the first communication blocking request message includes at least one of a first identifier of a target UAV or a second identifier of a target controller for controlling the target UAV, and the first communication blocking request message instructs a core network device to disconnect a communication connection between the target UAV and the target controller;

disconnect, according to the first communication blocking request message, the communication connection between the target UAV and the target controller; and send a first communication blocking response message to the UAV service management system, where the first communication blocking response message indicates that the communication connection between the target UAV and the target controller has been disconnected.

In a sixth aspect of the embodiments of the present disclosure, an apparatus for controlling communication is provided. The apparatus includes a processor and a memory configured to store instructions executable by the processor.

The processor is configured to:

send a first communication blocking request message to a core network device, where the first communication blocking request message includes at least one of a first identifier of a target unmanned aerial vehicle (UAV) or a second identifier of a target controller for controlling the target UAV, and the first communication blocking request message instructs the core network device to disconnect a communication connection between the target UAV and the target controller; and receive a first communication blocking response message from the core network device, where the first communication blocking response message indicates that the communication connection between the target UAV and the target controller has been disconnected.

In a seventh aspect of the embodiments of the present disclosure, there is provided a computer-readable storage medium having stored thereon computer instructions, which, when executed by a processor, implement the operations of the method described in the first aspect.

In an eighth aspect of the embodiments of the present disclosure, there is provided a computer readable storage medium having stored thereon computer instructions, which, when executed by a processor, implement the operations of the method described in the second aspect.

It should be understood that the foregoing general description and the following detailed description are merely exemplary and explanatory, and are not intended to restrict the disclosure.

BRIEF DESCRIPTION OF THE DRAWINGS

The accompanying drawings herein are incorporated into the specification and constitute part of the present specification, illustrate embodiments consistent with the disclosure and explain the principles of the disclosure together with the specification.

DETAILED DESCRIPTION

Detailed description will be made here to exemplary embodiments, examples of which are illustrated in the accompanying drawings. When drawings are involved in the following description, identical numerals in different drawings refer to identical or similar elements, unless otherwise indicated. Implementations described in the following exemplary embodiments do not mean all the implementations consistent with the disclosure. On the contrary, they are merely examples of apparatuses and methods consistent with some aspects of the disclosure detailed in the appended claims.

In the related art, an Unmanned Aerial System (UAS) includes an unmanned aerial vehicle (UAV) and an UAV controller, and an Unmanned Aerial Vehicle Traffic Management (UTM) is a background system or platform for managing the UAS. However, how to make the UAV and the UAV controller stop communication according to the requirements of the UTM through the cellular network is a technical problem that needs to be solved urgently.

In order to solve the above problem, the embodiments of the present disclosure provide a method for controlling communication. The method is applied to a core network device and includes that: a first communication blocking request message is received from an unmanned aerial vehicle (UAV) service management system, where the first communication blocking request message includes at least one of a first identifier of a target UAV or a second identifier of a target controller for controlling the target UAV, and the first communication blocking request message instructs the core network device to disconnect a communication connection between the target UAV and the target controller; the communication connection between the target UAV and the target controller is disconnected according to the first communication blocking request message; and a first communication blocking response message is sent to the UAV service management system, where the first communication blocking response message indicates that the communication connection between the target UAV and the target controller has been disconnected. In the method for controlling communication provided in the embodiments of the present disclosure, an UAV service management system sends a first communication blocking request message carrying at least one of a first identifier of a target UAV or a second identifier of a target controller to a core network device of a cellular network, and the core network device disconnects the communication connection between the target UAV and the target controller, so that the UAV service management system can prevent, through the cellular network, the target UAV from communicating with the target controller, thereby improving management efficiency of the UAV system.

Figure 1:
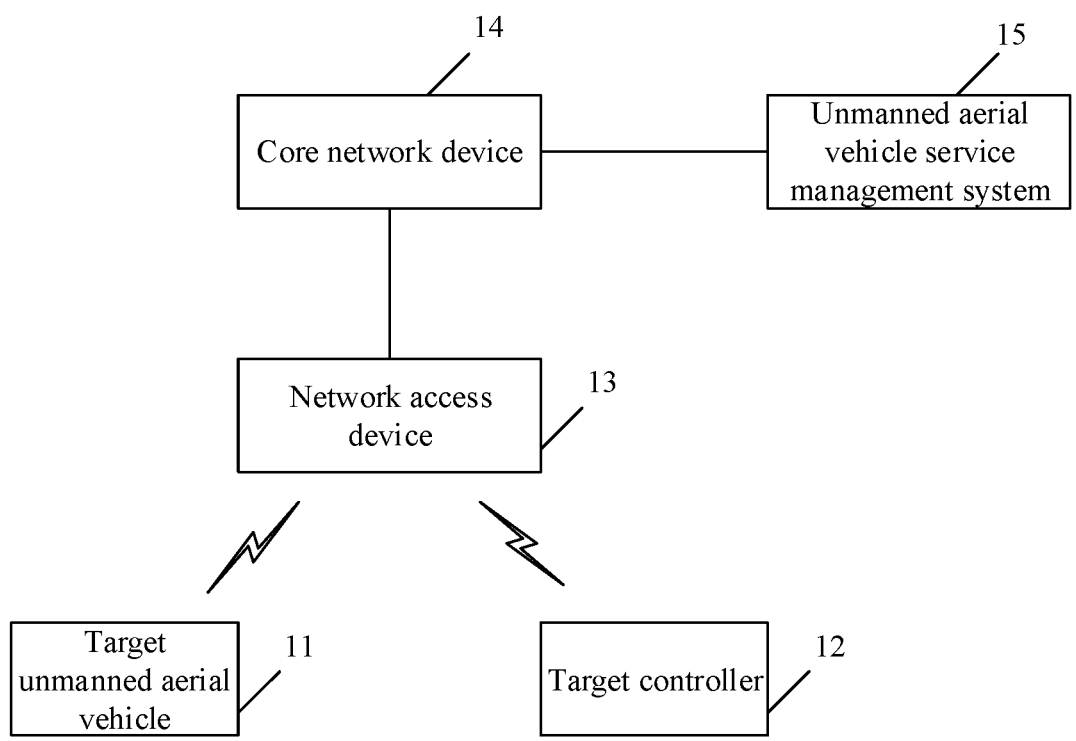
FIG. 1 is an application scenario diagram of a method for controlling communication according to an exemplary embodiment.

FIG. 1 illustrates an alternative application scenario of a method for controlling communication according to the embodiments of the present disclosure. The application scenario illustrated in FIG. 1 involves a target unmanned aerial vehicle (UAV) 11, a target controller 12, a network access device 13 of a cellular network, a core network device 14 of the cellular network, and an UAV service management system 15. For example, the target controller 12 may be an UAV-specific controller, or may be a smartphone, a tablet computer, or a wearable device (such as a bracelet) with UAV control software installed. The target UAV 11 and the target controller 12 have access to the network access device 13. The target controller 12 is used by a user to control and operate the target UAV 11 through the cellular network. The UAV service management system and the core network device perform data transmission and control information interaction through a communication interface between the UAV service management system and the core network device. The application scenario illustrated in FIG. 1 is only an example of a possible application scenario of the technical solution described in the embodiments of the present disclosure. Other application scenarios may include devices and networks not involved in FIG. 1.

It should be noted that the method for controlling communication provided in the embodiments of the present disclosure can be applied to $3^{rd}$ generation mobile communication technology (3G) network, $4^{th}$ generation mobile communication technology (4G) network, $5^{th}$ generation mobile communication technology (5G) network, or other cellular networks. For example, the network access device in the present disclosure may include a communication device (such as a base station or a relay station) that provides wireless access services for a terminal such as an UAV or a controller.

Based on the above analysis, the following specific embodiments are presented.

Figure 2:
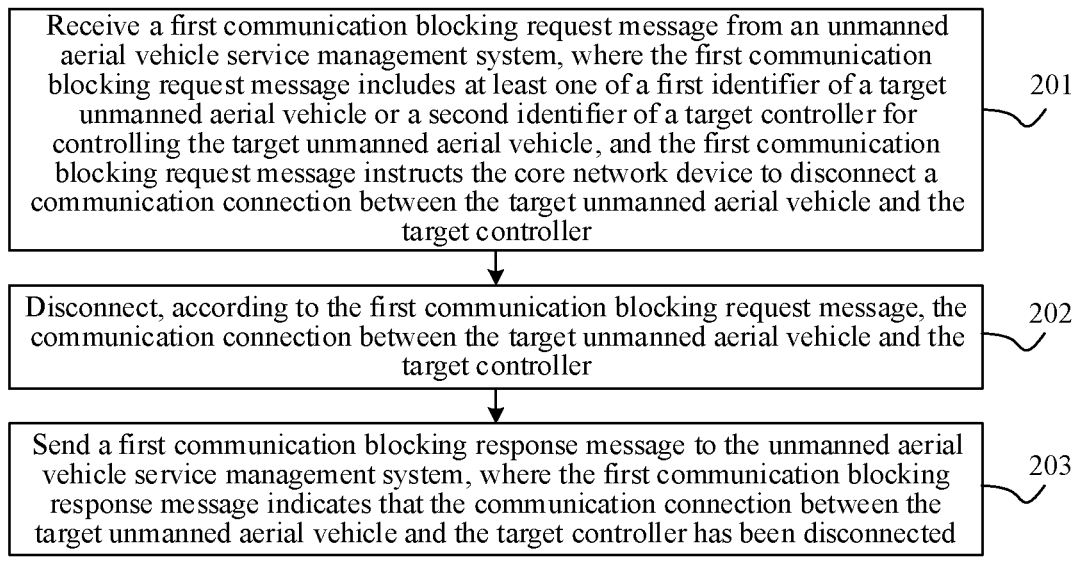
FIG. 2 is a flowchart of a method for controlling communication according to an exemplary embodiment.

FIG. 2 is a flowchart of a method for controlling communication according to an exemplary embodiment. The method for controlling communication in the embodiments of the present disclosure is performed by a core network device of a cellular network. As illustrated in FIG. 2, the method includes the following operations 201 to 203.

In 201, a first communication blocking request message is received from an unmanned aerial vehicle (UAV) service management system. The first communication blocking request message includes at least one of a first identifier of a target UAV or a second identifier of a target controller for controlling the target UAV, and the first communication blocking request message instructs the core network device to disconnect a communication connection between the target UAV and the target controller.

For example, the UAV service management system and the core network device perform data transmission and control information interaction through a communication interface between the UAV service management system and the core network device.

When the UAV service management system decides to block communication between the target UAV and the target controller for controlling the target UAV, the UAV service management system sends a first communication blocking request message to the core network device through a communication interface between the UAV service management system and the core network device, and the first communication blocking request message includes at least one of a first identifier of the target UAV or a second identifier of the target controller for controlling the target UAV. The core network device receives and parses the first communication blocking request message, obtains at least one of the first identifier of the target UAV or the second identifier of the target controller, and learns that the communication connection between the target UAV and the target controller needs to be disconnected.

In 202, the communication connection between the target UAV and the target controller is disconnected according to the first communication blocking request message.

For example, when the core network device learns that the communication connection between the target UAV and the target controller needs to be disconnected by receiving and parsing the first communication blocking request message, the core network device may directly send detach request signaling to at least one of the target UAV or the target controller to directly disconnect at least one of the target UAV or the target controller, which receives the detach request signaling, from the cellular network, thereby disconnecting the communication connection between the target UAV and the target controller. Alternatively, the first identifier of the target UAV and the second identifier of the target controller may be carried in the detach request signaling, and the target UAV and/or the target controller, which receive the detach request signaling, may be disconnected from a corresponding target controller and/or a corresponding target UAV while being disconnected from the cellular network. In an example, the target UAV that receives the detach request signaling may also disconnect the communication connection with the target controller corresponding to the target UAV while being disconnected from the cellular network. In another example, the target controller that receives the detach request signaling may also disconnect the communication connection with the target UAV corresponding to the target controller while being disconnected from the cellular network.

Or, after receiving the first communication blocking request message, the core network device sends a second communication blocking request message to a target network access device to which at least one of the target UAV or the target controller belongs through the interface between the core network device and the target network access device, to instruct the target network access device to disconnect the communication connection between the target UAV and the target controller. For example, the core network device informs, through UE context modification request signaling, the target network access device to disconnect the communication connection between the target UAV and the target controller. After receiving the second communication blocking request message from the core network device, the target network access device instructs at least one of the target UAV or the target controller to stop communication through RRC signaling (such as RRC connection reconfiguration signaling or RRC connection release signaling). For example, if the target network access device sends RRC connection release signaling to the target UAV, the target UAV directly disconnects the RRC connection with the target network access device after receiving the RRC connection release signaling, thereby disconnecting the communication connection between the target UAV and the target controller. If the target network access device sends RRC connection reconfiguration signaling to the target UAV, the target UAV maintains the RRC connection with the target network access device after receiving the RRC connection reconfiguration signaling, and disconnects the communication connection between the target UAV and the target controller.

In 203, a first communication blocking response message is sent to the UAV service management system, where the first communication blocking response message indicates that the communication connection between the target UAV and the target controller has been disconnected.

For example, after the communication connection between the target UAV and the target controller is disconnected according to the first communication blocking request message, the core network device sends the first communication blocking response message to the UAV service management system to inform the UAV service management system that the communication connection between the target UAV and the target controller has been disconnected.

According to the technical solution provided in the embodiments of the present disclosure, an UAV service management system sends a first communication blocking request message carrying at least one of a first identifier of a target UAV or a second identifier of a target controller to a core network device of a cellular network, and the core network device disconnects the communication connection between the target UAV and the target controller, so that the UAV service management system can prevent, through the cellular network, the target UAV from communicating with the target controller, thereby improving management efficiency of the UAV system.

Figure 3:
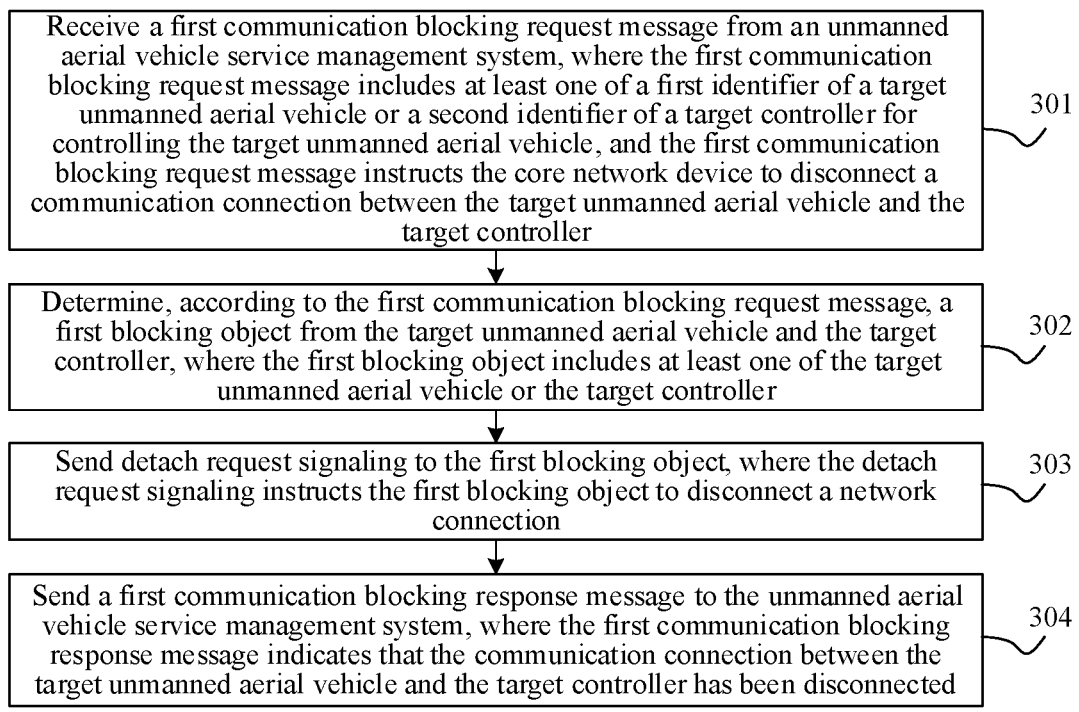
FIG. 3 is a flowchart of a method for controlling communication according to an exemplary embodiment.

FIG. 3 is a flowchart of a method for controlling communication according to an exemplary embodiment. On the basis of the above-described embodiments, the method illustrated in FIG. 3 includes the following operations 301 to 304. The parts that are not described in detail in the present embodiment may be described with reference to the corresponding description of the embodiment of FIG. 2.

In 301, a first communication blocking request message is received from an unmanned aerial vehicle (UAV) service management system. The first communication blocking request message includes at least one of a first identifier of a target UAV or a second identifier of a target controller for controlling the target UAV, and the first communication blocking request message instructs the core network device to disconnect a communication connection between the target UAV and the target controller.

For example, when the first communication blocking request message includes only an identifier of a device A (such as, the first communication blocking request message includes only a first identifier of the target UAV or only a second identifier of the target controller), the core network device obtains a identifier of a device B communicating with the device A by querying context information of the device A according to the identifier of the device A. For example, when the first communication blocking request message includes only the first identifier of the target UAV, the core network device obtains the second identifier of the target controller communicating with the target UAV by querying context information of the target UAV.

In 302, a first blocking object is determined from the target UAV and the target controller according to the first communication blocking request message. The first blocking object includes at least one of the target UAV or the target controller.

For example, after the core network device learns the target UAV and the target controller that need to block communication according to the first communication blocking request message, the core network device randomly selects one or both of the target UAV and the target controller as the first blocking object, or determines the first blocking object from the target UAV and the target controller according to a pre-obtained blocking device type. The pre-obtained blocking device type may include, for example, at least one of the UAV or the controller.

In 303, detach request signaling is sent to the first blocking object, where the detach request signaling instructs the first blocking object to disconnect a network connection.

In 304, a first communication blocking response message is sent to the UAV service management system. The first communication blocking response message indicates that the communication connection between the target UAV and the target controller has been disconnected.

According to the technical solutions provided in the embodiments of the present disclosure, after receiving the first communication blocking request message from the UAV service management system, the core network device directly sends detach request signaling to at least one of the target UAV or the target controller, and directly instructs at least one of the target UAV or the target controller, which receives the detach request signaling, to disconnect the network connection, thereby disconnecting the communication connection between the target UAV and the target controller. The UAV service management system can block, through the core network device of the cellular network, the target UAV from communicating with the target controller, thereby improving the management efficiency of the UAV system.

In an embodiment, the detach request signaling from the core network device to the first blocking object in operation 303 includes an identifier of a first peer device in communication with the first blocking object, and the detach request signaling instructs the first blocking object to disconnect the communication connection with the first peer device. Herein the first peer device is a device that communicates with the first blocking object, for example, when the first blocking object is the target UAV, the first peer device refers to the target controller; when the first blocking object is the target controller, the first peer device refers to the target UAV. After receiving the detach request signaling, the first blocking object disconnects the network connection and disconnects the communication connection with the first peer device, so that the UAV service management system can block the target UAV from communicating with the target controller through the core network device of the cellular network, and the management efficiency of the UAV system is improved.

Figure 4:
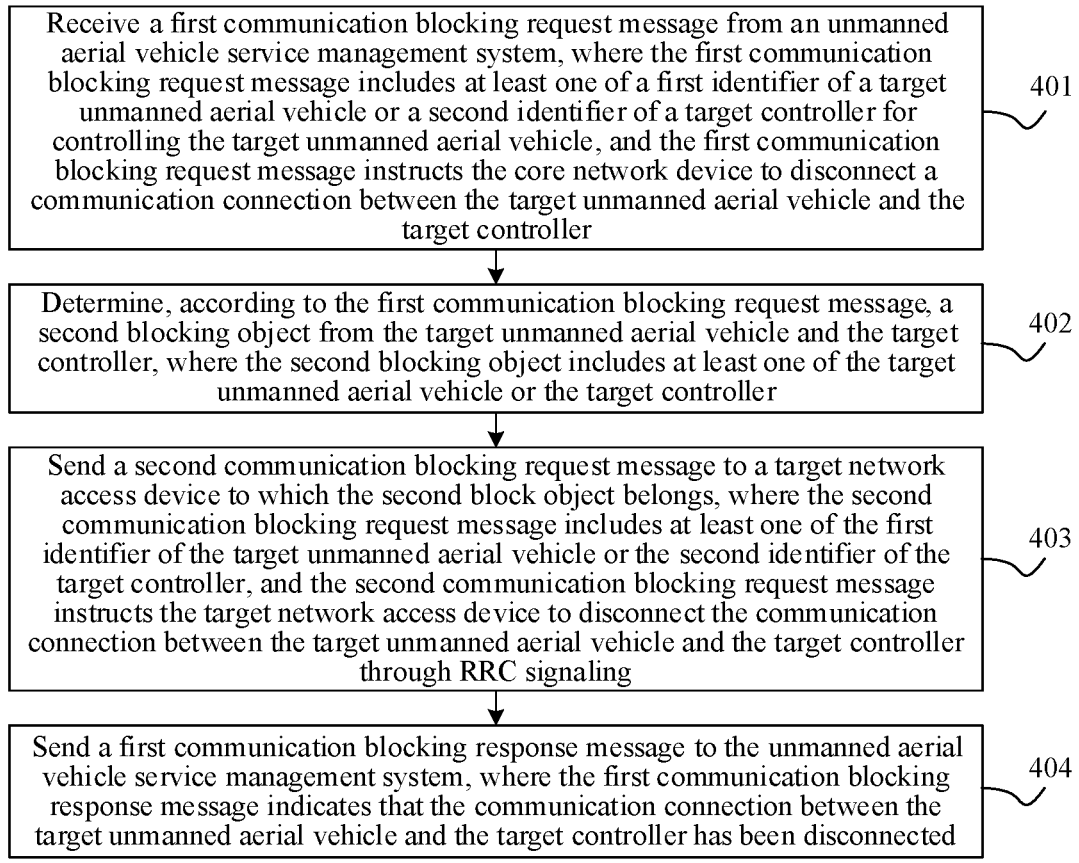
FIG. 4 is a flowchart of a method for controlling communication according to an exemplary embodiment.

FIG. 4 is a flowchart of a method for controlling communication according to an exemplary embodiment. On the basis of the above-described embodiments, the method illustrated in FIG. 4 includes the following operations 401 to 404. The parts that are not described in detail in the present embodiment may be described with reference to the corresponding description of the embodiment of FIG. 2.

In 401, a first communication blocking request message is received from an unmanned aerial vehicle (UAV) service management system. The first communication blocking request message includes at least one of a first identifier of a target UAV or a second identifier of a target controller for controlling the target UAV, and the first communication blocking request message instructs the core network device to disconnect a communication connection between the target UAV and the target controller.

In 402, a second blocking object is determined from the target UAV and the target controller according to the first communication blocking request message. The second blocking object includes at least one of the target UAV or the target controller.

In 403, a second communication blocking request message is sent to a target network access device to which the second block object belongs. The second communication blocking request message includes at least one of the first identifier of the target UAV or the second identifier of the target controller, and the second communication blocking request message instructs the target network access device to disconnect the communication connection between the target UAV and the target controller through RRC signaling.

In 404, a first communication blocking response message is sent to the UAV service management system. The first communication blocking response message indicates that the communication connection between the target UAV and the target controller has been disconnected.

According to the technical solutions provided in the embodiments of the present disclosure, after receiving the first communication blocking request message from the UAV service management system, the core network device sends the second communication blocking request message to the target network access device to which at least one of the target UAV or the target controller belongs to instruct the target network access device to disconnect the communication connection between the target UAV and the target controller through RRC signaling, so that the UAV service management system can prevent, through the cellular network, the target UAV from communicating with the target controller, and the management efficiency of the UAV system is improved.

In an embodiment, the second communication blocking request message from the core network device to the target network access device to which the second blocking object belongs in operation 403 includes UE context modification request signaling. Through the UE context modification request signaling, the core network device informs the target network access device to which the second blocking object belongs to disconnect the communication connection between the target UAV and the target controller. The existing signaling of the cellular network can be used to simplify the implementation of the scheme and improve the management efficiency of the UAV system.

Figure 5:
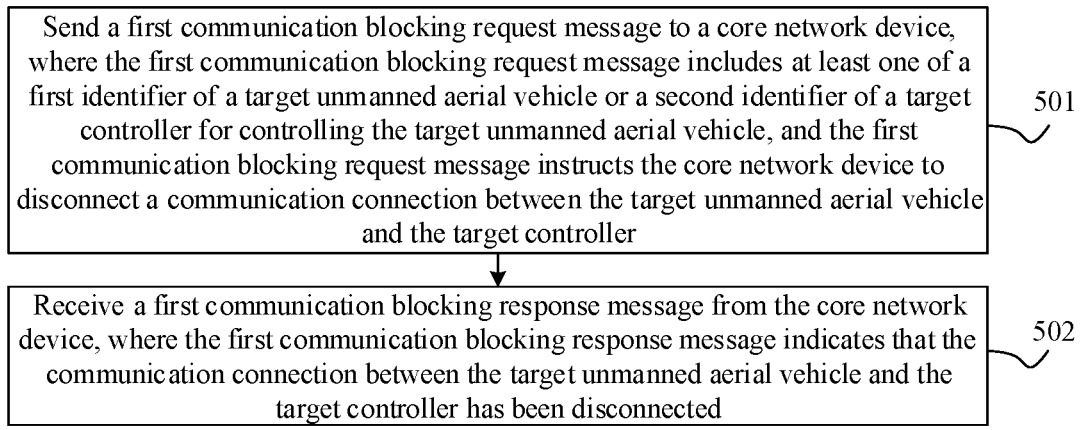
FIG. 5 is a flowchart of a method for controlling communication according to an exemplary embodiment.

FIG. 5 is a flowchart of a method for controlling communication according to an exemplary embodiment. The method for controlling communication in the embodiments of the present disclosure is performed by an unmanned aerial vehicle (UAV) service management system. As illustrated in FIG. 5, the method includes the following operations 501 and 502.

In 501, a first communication blocking request message is sent to a core network device. The first communication blocking request message includes at least one of a first identifier of a target UAV or a second identifier of a target controller for controlling the target UAV, and the first communication blocking request message instructs the core network device to disconnect a communication connection between the target UAV and the target controller.

For example, the UAV service management system and the core network device perform data transmission and control information interaction through a communication interface between the UAV service management system and the core network device. When the UAV service management system decides to block the communication between the target UAV and the target controller for controlling the target UAV, the first communication blocking request message may be sent to the core network device through the communication interface between the UAV service management system and the core network device. The first communication blocking request message includes the first identifier of the target UAV and the second identifier of the target controller and instructs the core network device to disconnect the communication connection between the target UAV and the target controller.

Parts of this embodiment that are not described in detail may be described with reference to the corresponding description of the embodiment of FIG. 2.

In 502, a first communication blocking response message is received from the core network device. The first communication blocking response message indicates that the communication connection between the target UAV and the target controller has been disconnected.

For example, after receiving the first communication blocking response message from the core network device, the UAV service management system learns that the communication connection between the target UAV and the target controller has been disconnected.

According to the technical solution provided in the embodiments of the present disclosure, an UAV service management system sends a first communication blocking request message carrying at least one of a first identifier of a target UAV or a second identifier of a target controller to a core network device of a cellular network, and the core network device disconnects the communication connection between the target UAV and the target controller, so that the UAV service management system can prevent, through the cellular network, the target UAV from communicating with the target controller, thereby improving management efficiency of the UAV system.

Figure 6:
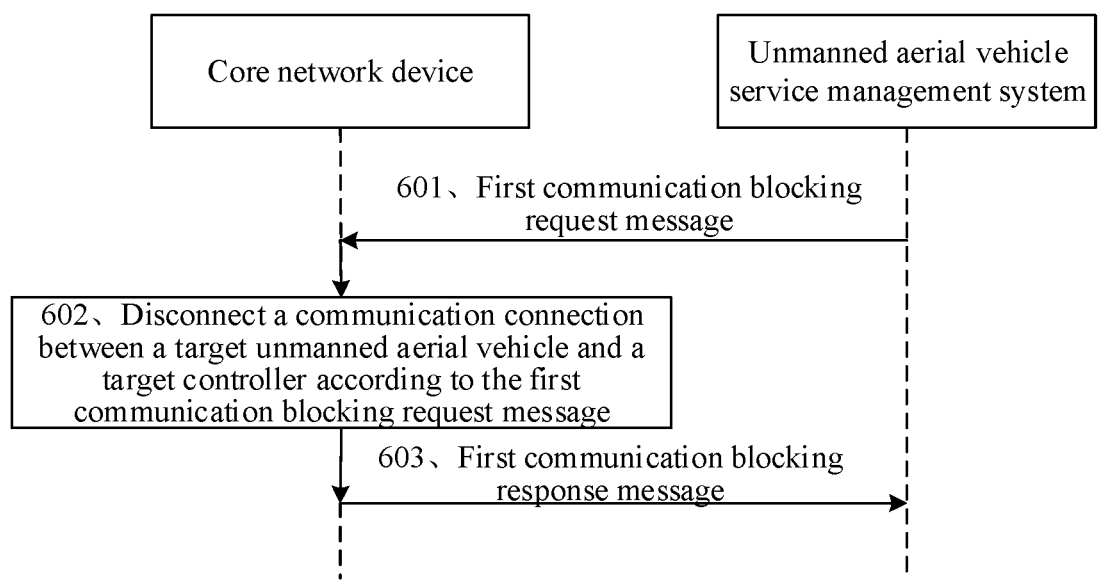
FIG. 6 is a flowchart of a method for controlling communication according to an exemplary embodiment.

FIG. 6 is a flowchart of a method for controlling communication according to an exemplary embodiment. As illustrated in FIG. 6, the method for controlling communication in the embodiments of the present disclosure is implemented by an unmanned aerial vehicle (UAV) service management system and a core network device, and includes the following operations 601 to 603.

In 601, the UAV service management system sends a first communication blocking request message to the core network device. Herein the first communication blocking request message includes at least one of a first identifier of a target UAV or a second identifier of a target controller for controlling the target UAV, and the first communication blocking request message instructs the core network device to disconnect a communication connection between the target UAV and the target controller. The core network device receives the first communication blocking request message from the UAV service management system.

In 602, the core network device disconnects the communication connection between the target UAV and the target controller according to the first communication blocking request message.

Parts of this embodiment that are not described in detail may be described with reference to the corresponding description of the embodiments of FIG. 2 and FIG. 5.

In 603, the core network device sends a first communication blocking response message to the UAV service management system. Herein the first communication blocking response message indicates that the communication connection between the target UAV and the target controller has been disconnected. The UAV service management system receives the first communication blocking response message from the core network device.

According to the technical solution provided in the embodiments of the present disclosure, an UAV service management system sends a first communication blocking request message carrying at least one of a first identifier of a target UAV or a second identifier of a target controller to a core network device of a cellular network, and the core network device disconnects the communication connection between the target UAV and the target controller, so that the UAV service management system can prevent, through the cellular network, the target UAV from communicating with the target controller, thereby improving management efficiency of the UAV system.

The following are device embodiments of the present disclosure, which may be used to execute the method embodiments of the present disclosure. The parts of the device embodiments that are not described in detail can refer to the method embodiments.

Figure 7:
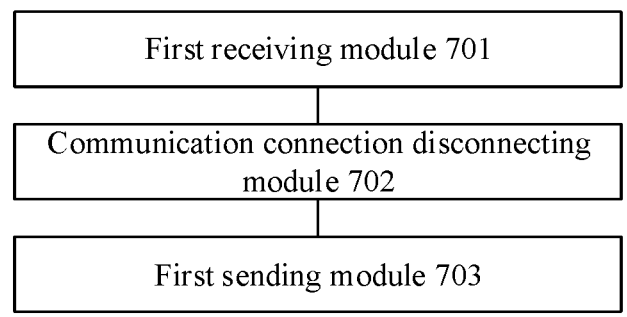
FIG. 7 is a block diagram of an apparatus for controlling communication according to an exemplary embodiment.

FIG. 7 is a block diagram of an apparatus for controlling communication according to an exemplary embodiment. The apparatus may be applied to a core network device. Referring to FIG. 7, the apparatus for controlling communication includes a first receiving module 701, a communication connection disconnecting module 702, and a first sending module 703.

The first receiving module 701 is configured to receive a first communication blocking request message from an unmanned aerial vehicle (UAV) service management system. The first communication blocking request message includes at least one of a first identifier of a target UAV or a second identifier of a target controller for controlling the target UAV, and the first communication blocking request message instructs the core network device to disconnect a communication connection between the target UAV and the target controller.

The communication connection disconnecting module 702 is configured to disconnect, according to the first communication blocking request message, the communication connection between the target UAV and the target controller.

The first sending module 703 is configured to send a first communication blocking response message to the UAV service management system. The first communication blocking response message indicates that the communication connection between the target UAV and the target controller has been disconnected.

According to the technical solution provided in the embodiments of the present disclosure, an UAV service management system sends a first communication blocking request message carrying at least one of a first identifier of a target UAV or a second identifier of a target controller to a core network device of a cellular network, and the core network device disconnects the communication connection between the target UAV and the target controller, so that the UAV service management system can prevent, through the cellular network, the target UAV from communicating with the target controller, thereby improving management efficiency of the UAV system.

Figure 8:
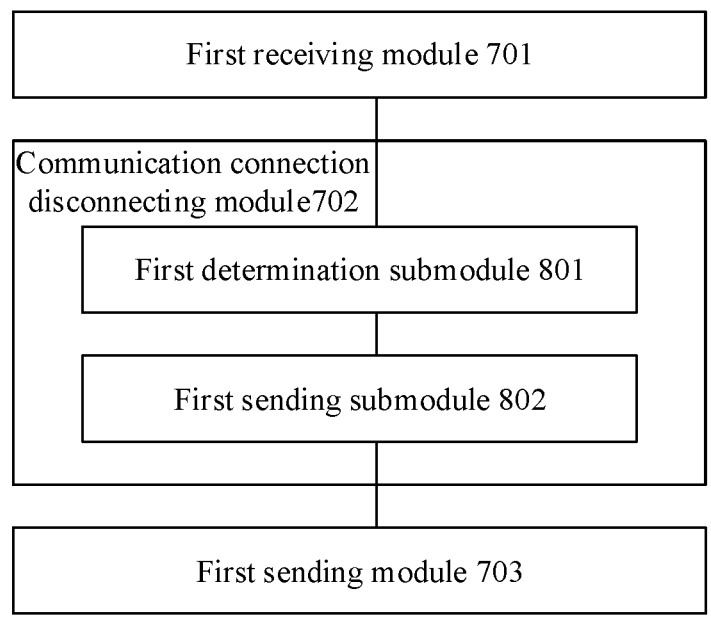
FIG. 8 is a block diagram of an apparatus for controlling communication according to an exemplary embodiment.

In an embodiment, as illustrated in FIG. 8, the communication connection disconnecting module 702 in the apparatus for controlling communication illustrated in FIG. 7 may further include a first determination sub-module 801 and a first sending sub-module 802.

The first determination sub-module 801 is configured to determine, according to the first communication blocking request message, a first blocking object from the target UAV and the target controller. The first blocking object includes at least one of the target UAV or the target controller.

The first sending sub-module 802 is configured to send detach request signaling to the first blocking object. The detach request signaling instructs the first blocking object to disconnect a network connection.

In an embodiment, the detach request signaling includes an identifier of a first peer device in communication with the first blocking object, and the detach request signaling instructs the first blocking object to disconnect a communication connection with the first peer device.

Figure 9:
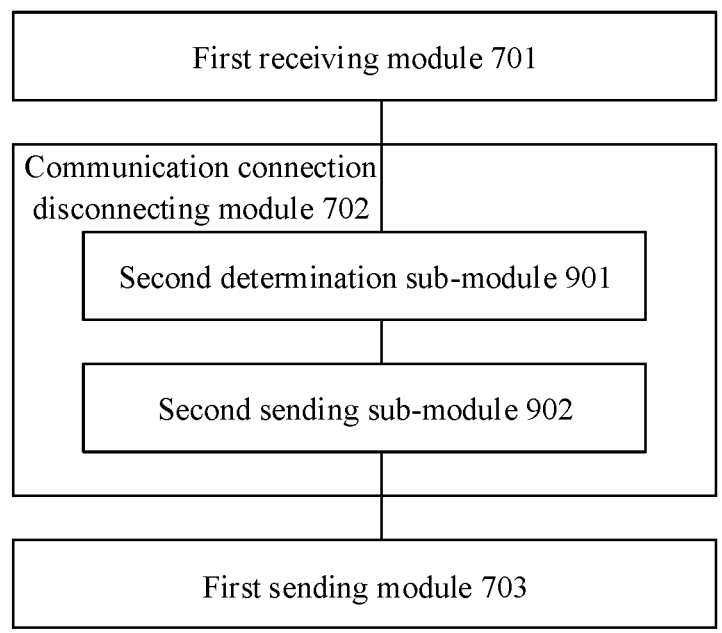
FIG. 9 is a block diagram of an apparatus for controlling communication according to an exemplary embodiment.

In an embodiment, as illustrated in FIG. 9, the communication connection disconnecting module 702 in the apparatus for controlling communication illustrated in FIG. 7 may further a second determination sub-module 901 and a second sending sub-module 902.

The second determination sub-module 901 is configured to determine, according to the first communication blocking request message, a second blocking object from the target UAV and the target controller. The second blocking object includes at least one of the target UAV or the target controller.

The second sending sub-module 902 is configured to send a second communication blocking request message to a target network access device to which the second blocking object belongs. The second communication blocking request message includes at least one of the first identifier of the target UAV or the second identifier of the target controller, and the second communication blocking request message instructs the target network access device to disconnect the communication connection between the target UAV and the target controller through RRC signaling.

In an embodiment, the second communication blocking request message includes UE context modification request signaling.

Figure 10:
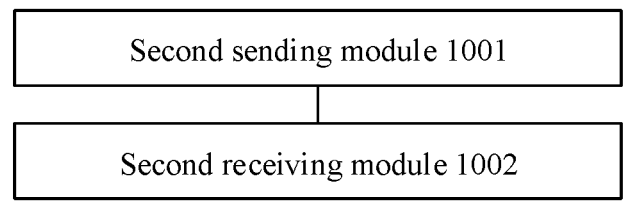
FIG. 10 is a block diagram of an apparatus for controlling communication according to an exemplary embodiment.

FIG. 10 is a block diagram of an apparatus for controlling communication according to an exemplary embodiment. The apparatus may be applied to an unmanned aerial vehicle (UAV) service management system. Referring to FIG. 10, the apparatus for controlling communication includes a second sending module 1001 and a second receiving module 1002.

The second sending module 1001 is configured to send a first communication blocking request message to a core network device. The first communication blocking request message includes at least one of a first identifier of a target UAV or a second identifier of a target controller for controlling the target UAV, and the first communication blocking request message instructs the core network device to disconnect a communication connection between the target UAV and the target controller.

The second receiving module 1002 is configured to receive a first communication blocking response message from the core network device. The first communication blocking response message indicates that the communication connection between the target UAV and the target controller has been disconnected.

According to the technical solution provided in the embodiments of the present disclosure, an UAV service management system sends a first communication blocking request message carrying at least one of a first identifier of a target UAV or a second identifier of a target controller to a core network device of a cellular network, and the core network device disconnects the communication connection between the target UAV and the target controller, so that the UAV service management system can prevent, through the cellular network, the target UAV from communicating with the target controller, thereby improving management efficiency of the UAV system.

Figure 11:
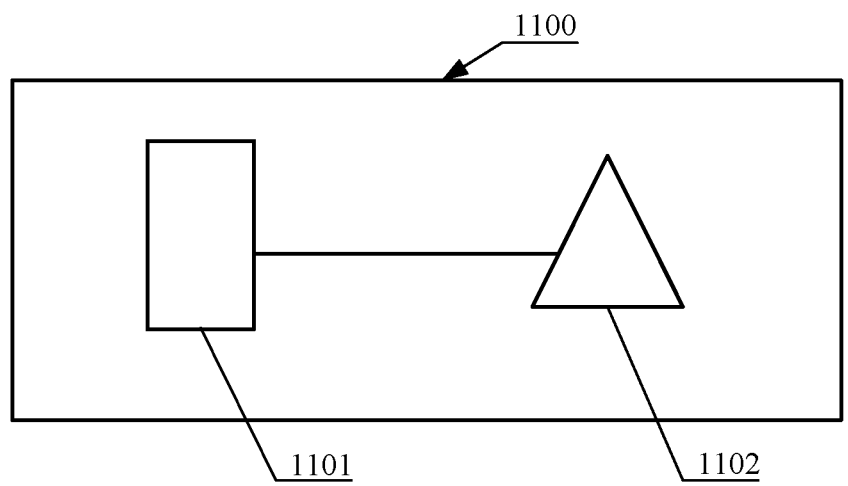
FIG. 11 is a block diagram of an apparatus for controlling communication according to an exemplary embodiment.

FIG. 11 is a block diagram of an apparatus 1100 for controlling communication according to an exemplary embodiment. The apparatus is applied to a core network device. The apparatus 1100 for controlling communication includes:

a processor 1101; and a memory, configured to store instructions executable by the processor, the processor 1101 is configured to:

receive a first communication blocking request message from an unmanned aerial vehicle (UAV) service management system, where the first communication blocking request message includes at least one of a first identifier of a target UAV or a second identifier of a target controller for controlling the target UAV, and the first communication blocking request message instructs a core network device to disconnect a communication connection between the target UAV and the target controller;

disconnect, according to the first communication blocking request message, the communication connection between the target UAV and the target controller; and send a first communication blocking response message to the UAV service management system, where the first communication blocking response message indicates that the communication connection between the target UAV and the target controller has been disconnected.

In an embodiment, the processor 1101 is further configured to:

determine, according to the first communication blocking request message, a first blocking object from the target UAV and the target controller, where the first blocking object includes at least one of the target UAV or the target controller; and send detach request signaling to the first blocking object, where the detach request signaling instructs the first blocking object to disconnect a network connection.

In an embodiment, the detach request signaling includes an identifier of a first peer device in communication with the first blocking object, and the detach request signaling instructs the first blocking object to disconnect a communication connection with the first peer device.

In an embodiment, the processor 1101 is further configured to:

determine, according to the first communication blocking request message, a second blocking object from the target UAV and the target controller, where the second blocking object includes at least one of the target UAV or the target controller; and send a second communication blocking request message to a target network access device to which the second block object belongs, where the second communication blocking request message includes at least one of the first identifier of the target UAV or the second identifier of the target controller, and the second communication blocking request message instructs the target network access device to disconnect the communication connection between the target UAV and the target controller through RRC signaling.

In an embodiment, the second communication blocking request message includes UE context modification request signaling.

Figure 12:
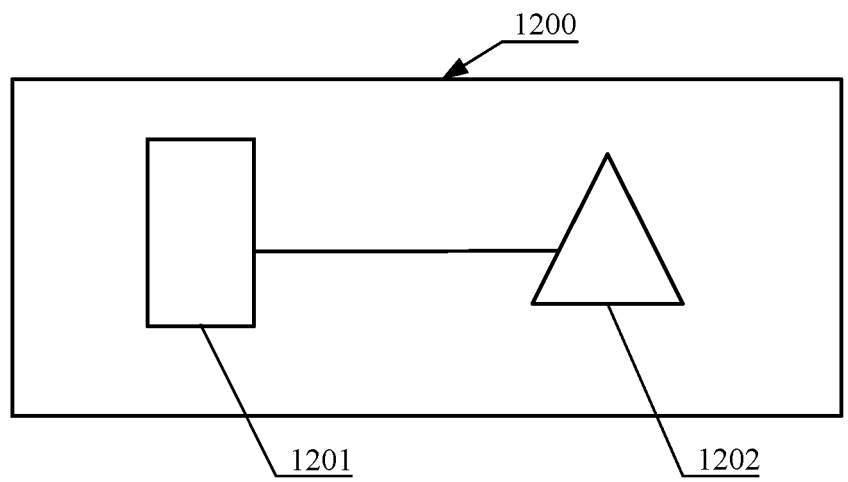
FIG. 12 is a block diagram of an apparatus for controlling communication according to an exemplary embodiment.

FIG. 12 is a block diagram of an apparatus 1200 for controlling communication according to an exemplary embodiment. The apparatus is applied to an unmanned aerial vehicle (UAV) service management system. The apparatus 1200 for controlling communication includes:

a processor 1201;

a memory 1202, configured to store instructions executable by the processor, the processor 1201 is configured to:

send a first communication blocking request message to a core network device, where the first communication blocking request message includes at least one of a first identifier of a target UAV or a second identifier of a target controller for controlling the target UAV, and the first communication blocking request message instructs the core network device to disconnect a communication connection between the target UAV and the target controller; and receive a first communication blocking response message from the core network device, where the first communication blocking response message indicates that the communication connection between the target UAV and the target controller has been disconnected.

With respect to the apparatuses in the above-described embodiments, the specific manners in which the various modules perform operations have been described in detail in the embodiments relating to the methods, and will not be described in detail herein.

Figure 13:
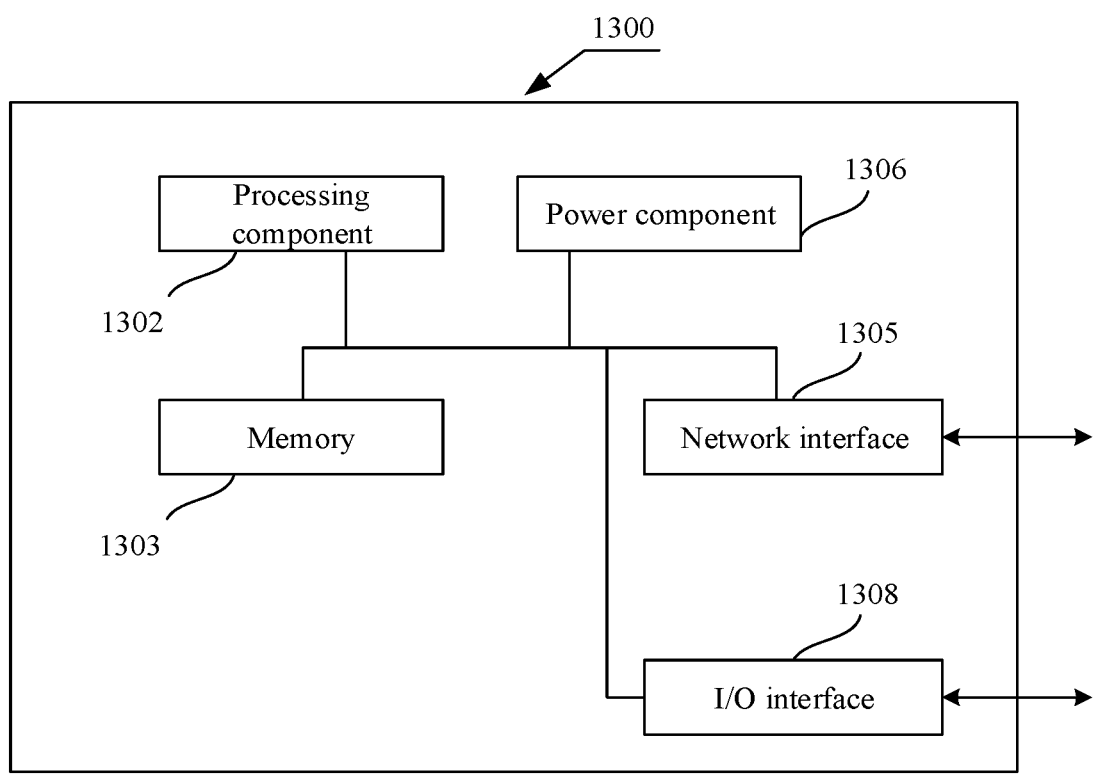
FIG. 13 is a block diagram of an apparatus for controlling communication according to an exemplary embodiment.

FIG. 13 is a block diagram of an apparatus for controlling communication according to an exemplary embodiment. For example, the apparatus 1300 for controlling communication may be provided as a server. The apparatus 1300 for controlling communication includes a processing component 1302 and a memory resource represented by a memory 1303. The processing component 1302 includes one or more processors. The memory 1303 is configured to store instructions executable by the processing component 1302, such as applications. The application stored in the memory 1303 may include one or more modules each corresponding to a set of instructions. In addition, the processing component 1302 is configured to execute instructions to perform the above-described methods.

The apparatus 1300 for controlling communication may also include a power component 1306 configured to perform power management on the apparatus 1300 for controlling communication, a wired or wireless network interface 1305 configured to connect the apparatus 1300 for controlling communication to a network, and an Input/Output (I/O) interface 1308. The apparatus 1300 for controlling communication may operate based on an operating system stored in the memory 1303, such as Windows Server™, Mac OS X™, Unix™, Linux™, FreeBSD™, or the like.

A non-transitory computer-readable storage medium, for example, may be a Read Only Memory (ROM), a Random-Access Memory (RAM), a Compact Disc (CD)-ROM, a magnetic tape, a floppy disk, an optical data storage device, or the like. The instructions in the storage medium, when executed by the processor of the apparatus 1300 for controlling communication, cause the apparatus 1300 for controlling communication to perform the following method, the method includes that:

a first communication blocking request message is received from an unmanned aerial vehicle (UAV) service management system, where the first communication blocking request message includes at least one of a first identifier of a target UAV or a second identifier of a target controller for controlling the target UAV, and the first communication blocking request message instructs the core network device to disconnect a communication connection between the target UAV and the target controller;

the communication connection between the target UAV and the target controller is disconnected according to the first communication blocking request message; and a first communication blocking response message is sent to the UAV service management system, where the first communication blocking response message indicates that the communication connection between the target UAV and the target controller has been disconnected.

In an embodiment, the operation of disconnecting, according to the first communication blocking request message, the communication connection between the target UAV and the target controller includes that:

a first blocking object is determined from the target UAV and the target controller according to the first communication blocking request message, where the first blocking object includes at least one of the target UAV or the target controller; and detach request signaling is sent to the first blocking object, where the detach request signaling instructs the first blocking object to disconnect a network connection.

In an embodiment, the detach request signaling includes an identifier of a first peer device in communication with the first blocking object, and the detach request signaling instructs the first blocking object to disconnect a communication connection with the first peer device.

In an embodiment, the operation of disconnecting, according to the first communication blocking request message, the communication connection between the target UAV and the target controller includes that:

a second blocking object is determined from the target UAV and the target controller according to the first communication blocking request message, where the second blocking object includes at least one of the target UAV or the target controller; and a second communication blocking request message is sent to a target network access device to which the second block object belongs, where the second communication blocking request message includes at least one of the first identifier of the target UAV or the second identifier of the target controller, and the second communication blocking request message instructs the target network access device to disconnect the communication connection between the target UAV and the target controller through RRC signaling.

In an embodiment, the second communication blocking request message includes UE context modification request signaling.

Other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

It should be understood that the disclosure is not limited to the precise construction already described above and illustrated in the drawings, and various modifications and changes may be made without departing from the scope thereof. The scope of the disclosure is limited only by the appended claims.

What is claimed is:

1. A method for controlling communication, applied to a core network device, the method comprising:
    receiving a first communication blocking request message from an unmanned aerial vehicle (UAV) service management system, wherein the first communication blocking request message comprises at least one of a first identifier of a target UAV or a second identifier of a target controller for controlling the target UAV, and the first communication blocking request message instructs the core network device to disconnect a communication connection between the target UAV and the target controller;
    disconnecting, according to the first communication blocking request message, the communication connection between the target UAV and the target controller; and
    sending a first communication blocking response message to the UAV service management system, wherein the first communication blocking response message indicates that the communication connection between the target UAV and the target controller has been disconnected.

2. The method of claim 1, wherein said disconnecting, according to the first communication blocking request message, the communication connection between the target UAV and the target controller comprises:
    determining, according to the first communication blocking request message, a first blocking object from the target UAV and the target controller, wherein the first blocking object comprises at least one of the target UAV or the target controller; and
    sending detach request signaling to the first blocking object, wherein the detach request signaling instructs the first blocking object to disconnect a network connection.

3. The method of claim 2, wherein the detach request signaling comprises an identifier of a first peer device in communication with the first blocking object, and the detach request signaling instructs the first blocking object to disconnect a communication connection with the first peer device.

4. The method of claim 1, wherein said disconnecting, according to the first communication blocking request message, the communication connection between the target UAV and the target controller comprises:
    determining, according to the first communication blocking request message, a second blocking object from the target UAV and the target controller, wherein the second blocking object comprises at least one of the target UAV or the target controller; and
    sending a second communication blocking request message to a target network access device to which the second block object belongs, wherein the second communication blocking request message comprises at least one of the first identifier of the target UAV or the second identifier of the target controller, and the second communication blocking request message instructs the target network access device to disconnect the communication connection between the target UAV and the target controller through Radio Resource Control (RRC) signaling.

5. The method of claim 4, wherein the second communication blocking request message comprises user equipment (UE) context modification request signaling.

6. A method for controlling communication, applied to an unmanned aerial vehicle (UAV) service management system, the method comprising:
    sending a first communication blocking request message to a core network device, wherein the first communication blocking request message comprises at least one of a first identifier of a target UAV or a second identifier of a target controller for controlling the target UAV, and the first communication blocking request message instructs the core network device to disconnect a communication connection between the target UAV and the target controller; and
    receiving a first communication blocking response message from the core network device, wherein the first communication blocking response message indicates that the communication connection between the target UAV and the target controller has been disconnected.

7. An apparatus for controlling communication, comprising:
    a processor; and
    memory, configured to store instructions executable by the processor,
    wherein the processor is configured to:
    receive a first communication blocking request message from an unmanned aerial vehicle (UAV) service management system, wherein the first communication blocking request message comprises at least one of a first identifier of a target UAV or a second identifier of a target controller for controlling the target UAV, and the first communication blocking request message instructs the core network device to disconnect a communication connection between the target UAV and the target controller;
    disconnect, according to the first communication blocking request message, the communication connection between the target UAV and the target controller; and
    send a first communication blocking response message to the UAV service management system, wherein the first communication blocking response message indicates that the communication connection between the target UAV and the target controller has been disconnected.

8. The apparatus of claim 7, wherein the processor is further configured to:
    determine, according to the first communication blocking request message, a first blocking object from the target UAV and the target controller, wherein the first blocking object comprises at least one of the target UAV or the target controller; and send detach request signaling to the first blocking object, wherein the detach request signaling instructs the first blocking object to disconnect a network connection.

9. The apparatus of claim 8, wherein the detach request signaling comprises an identifier of a first peer device in communication with the first blocking object, and the detach request signaling instructs the first blocking object to disconnect a communication connection with the first peer device.

10. The apparatus of claim 7, wherein the processor is further configured to:

determine, according to the first communication blocking request message, a second blocking object from the target UAV and the target controller, wherein the second blocking object comprises at least one of the target UAV or the target controller; and send a second communication blocking request message to a target network access device to which the second blocking object belongs, wherein the second communication blocking request message comprises at least one of the first identifier of the target UAV or the second identifier of the target controller, and the second communication blocking request message instructs the target network access device to disconnect the communication connection between the target UAV and the target controller through RRC signaling.

11. The apparatus of claim 10, wherein the second communication blocking request message comprises user equipment (UE) context modification request signaling.

12. An apparatus implementing the method for controlling communication of claim 6, comprising:

a processor; and memory, configured to store instructions executable by the processor, wherein the processor is configured to execute the instructions stored in the memory to perform steps of the method.

13. A non-transitory computer-readable storage medium having stored therein computer instructions, which, when executed by a processor, cause the processor to perform steps of the method of claim 1.

14. A non-transitory computer readable storage medium having stored therein computer instructions, which, when executed by a processor, cause the processor to perform steps of the method of claim 6.

15. A communication system implementing the method for controlling communication of claim 1, comprising the core network device, wherein the core network device is configured to disconnect the communication connection between the target UAV and the target controller, to thereby prevent, through a cellular network, the target UAV from communicating with the target controller, and improve management efficiency of the UAV.

16. The communication system of claim 15, wherein the core network device is configured to directly send detach request signaling to at least one of the target UAV or the target controller, and directly instruct at least one of the target UAV or the target controller, which receives the detach request signaling, to disconnect a network connection, thereby disconnecting the communication connection between the target UAV and the target controller.

17. The communication system of claim 16, further comprising the UAV service management system.

18. The communication system of claim 17, wherein the UAV service management system is configured to:

send the first communication blocking request message to the core network device; and receive the first communication blocking response message from the core network device.

* * * * *